UNITED STATES PATENT OFFICE.

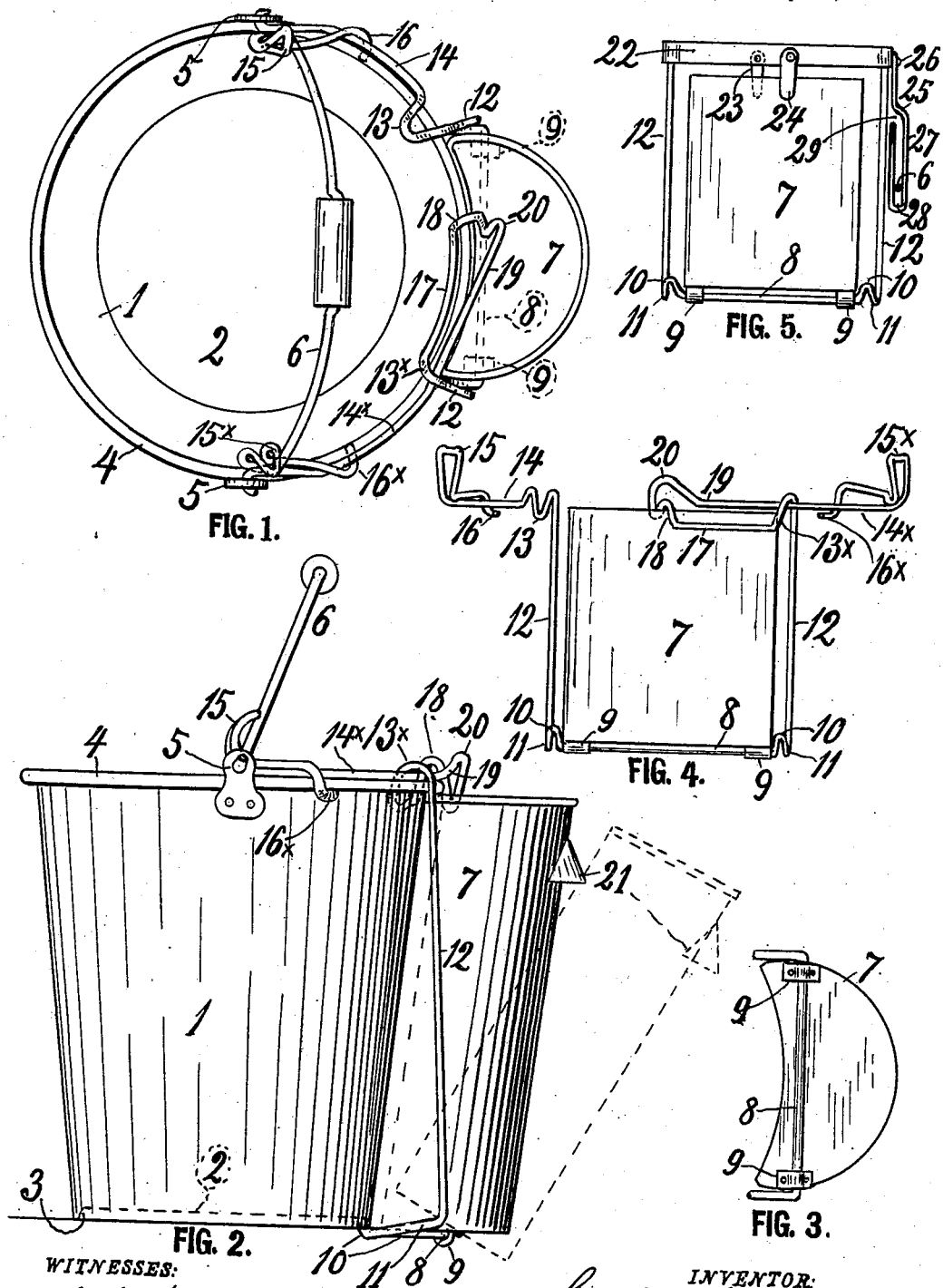

GUSTAF A. BROWN, OF ANNANDALE, MINNESOTA.

MILKING-PAIL ATTACHMENT.

992,480.  Specification of Letters Patent.  Patented May 16, 1911.

Application filed November 18, 1910. Serial No. 592,992.

*To all whom it may concern:*

Be it known that I, GUSTAF A. BROWN, a citizen of the United States, residing at Annandale, in the county of Wright and State of Minnesota, have invented a new and useful Milking-Pail Attachment, of which the following is a specification.

My invention relates to milking pails, and consists mainly of a vessel attached to one side of the milking pail for the carrying of water by which to wash the teats of the cows preparatory to the milking, in order that no sand or other dirt on the teats and udder of the animal may get into the milk.

It is, especially of late years, customary to wash the teats of the cows before the milking takes place, but this sanitary step is often neglected because of the inconvenience to carry along a second vessel with each milking vessel but separate therefrom. It is to overcome this inconvenience that I combine the water tank or vessel with the milking vessel as an attachment which may be removed whenever desired, and either vessel may be leaned over and emptied without emptying the other.

In the accompanying drawing, Figure 1 is a top view of an open milking vessel or pail with my water-holding attachment attached thereto by a specific form of attaching means or mounting. Fig. 2 is a side elevation of the milking vessel and water vessel shown in Fig. 1. Fig. 3 is a bottom view of the water vessel and the bar supporting it. Fig. 4 is a side elevation of the water carrying attachment in Figs. 1 and 2 on a reduced scale and looking toward the side of it detached from the pail. Fig. 5 is about the same as Fig. 4 only that the attaching means are modified.

Referring to the drawing by reference numerals, 1 designates a milking pail of the ordinary type, though it represents any suitable form of milking vessel. Its bottom 2 is slightly elevated to form a circular rim 3 for the pail to stand on; and the upper edge of the vessel is provided with the usual outward rim 4. The pail is also provided with the usual ears 5 and a bail 6 by which the pail is carried. Fitted to one side of the pail is a water vessel 7, which in the present illustration is about halfmoon-shaped in horizontal section.

In Figs. 1, 2 and 3 the means by which the two vessels are attached together consists of a single piece of spring wire, which near its middle forms a supporting shaft or bar 8 for the water vessel, which at its bottom is provided with two bearings 9 journaled on the shaft. At each side of the vessel 7 the wire is formed into a hook 10 adapted to take hold under the bottom rib 3 of the pail, from said hook the wire is returned substantially to the end of the shaft, forming thereby a spring-arm 11, from which extends upwardly a hanger wire or bar 12, whose upper end is formed with a hook 13, or 13×, adapted to take over the upper edge of the milking pail, and is held in said engagement by the downward action of the spring-arm 11.

From the hook 13 the wire is extended along the edge of the pail, as a curved arm, 14, which is formed with a loop-shaped brace 15, from which the wire is returned upon the arm 14 and is finally formed into a finger 16; the latter is designed to catch below the rim 4 of the pail and hold the arm 14 in position on the pail, while the brace 15 serves to hold the bail 6 in a leaning position toward the water vessel, so as to prevent the weight of the water vessel and its contents from leaning the pail over toward the vessel when carried by the bail. From the hook 13× extends a similar arm 14× with brace 15× and catch 16×; but between the hook 13× and the arm 14× the wire is formed with a spring-arm 17 and a hook 18; the latter is held downward by the arm 17 and engages the upper edges of both vessels and holds them together. From the hook 18 the wire is extended at 19 to the arm 14×, after being formed with a finger loop 20.

In the operation or use of the device, if the loop 20 be pulled upward, the hook 18 will release the upper end of the water vessel, and the latter may then be swung more or less outward on its supporting bar 8, as indicated in dotted lines in Fig. 2; which swinging or tilting enables the water vessel to be emptied, cleaned and filled, as well as freely used without danger of getting water from it into the milk; but the main object of the tilting is to enable the vessel to retain an upright position while the milking pail may be inclined and emptied, which is often desirable, and in doing so the operator simply grasps the handle of the bail 6 in one hand and the finger hold 21 of the water vessel by the fingers of the other hand, and after releasing the hook 18, either by pulling at loop 20 or by applying force to the finger-hold 21, he holds the water vessel upright while he permits the milking vessel to tilt with the shaft 8 turning in the bearings 9 until all the milk is emptied out into some larger vessel, after which the milking vessel is swung back upward to normal position and engaged by the hook 18. If the entire attachment is to be removed from the pail, the hooks 16, 13 and 10 are disengaged in the order just mentioned; and as the entire attachment is thus removed including the braces 15 and 15×, the bail 6 is permitted to resume its normal position directly above the pail. While the attachment is on the pail it will be observed that the bail is at all times at liberty to be folded toward the water vessel. The same is the case in the modified form in Fig. 5, which will now be described.

The modification shown in Fig. 5 is simply intended to give some idea of the fact that the invention may be made in many differently modified forms, especially by making the mounting of the water vessel of few or many pieces. In said view the side bars 12 have to their upper ends secured a horizontal bar 22, which by the spring arms 11 is held down upon the top edge of the milking pail. Near the middle of the bar 22 is pivoted a latch or catch 23 adapted to engage inside the upper edge of the water vessel; and another latch 24 designed to engage the inner side of the top edge of the milking pail and hold the attachment thereto as long as it is to remain on the pail. Instead of the braces 15, 15× in the other views the form in Fig. 5 has a single brace 25, pivoted at 26 and provided with a yoke 27, in which the bail 6 may swing and be folded down toward the water vessel, but in the opposite direction the swinging is limited by the terminal 28 of the yoke when the bail is in an inclined position, the same as in Figs. 1 and 2. The yoke is open at 29 to permit its removal from the bail 6 when the entire attachment is to be removed from the pail. Of course there may be a yoke-shaped brace like 25—27 at each end of the bar 22, so as to engage or brace both ends of the bail, especially when the milking vessel is an extra large one, so as to require it. It is also obvious that the catches or latches 23, 24 may be spring catches, or spring-pressed, instead of gravity-held as they may appear to be in Fig. 5; but in view of the spring-catches shown in other views it is considered unnecessary to show springs in Fig. 5 in connection with said catches.

Having thus described my invention, what I claim is:

1. The combination with a milking vessel and a vessel designed to contain water, of a mounting that is detachable from the milking vessel and involving a joint near the bottom end of the milking vessel with parts secured to the bottom end of the water vessel, and a catch for holding the upper ends of the two vessels detachably together with their upper edges, one vessel near the side of the other, whereby either vessel may be released and swung away from the other at its upper end.

2. The combination with a milking vessel having a bail by which to carry it, of a secondary vessel at the side thereof, a mounting holding said vessels together, and means on the mounting for engaging the bail and holding it inclined toward the secondary vessel in a manner permitting the bail to be folded toward the secondary vessel.

3. The combination with a milking vessel having a bail, of a secondary vessel at one side thereof, a mounting made of a single piece of spring wire hingedly attached to the lower end of the secondary vessel and formed with springy hooks arranged to engage the lower edge of the milking vessel, hooks arranged to engage over the upper edge of the milking vessel, a spring-arm with a hook arranged to take over the upper edges of both vessels, means on said hook for taking hold of in disengaging it; a pair of arms extending along the upper edges of the milking vessel and provided with bracing means for holding the bail inclined toward the secondary vessel, and fingers on said arms arranged to engage below the top rim of the milking vessel and hold the arms in proper position thereon.

4. The combination with a milking vessel of a secondary vessel attached at one side thereof, the lower portions of the vessels being hingedly held together, a catch for holding the upper ends of the vessels detachably together, and means on each vessel for taking hold of and holding either vessel upright while the other may be leaned over on the hinge, for the purposes set forth.

In testimony whereof I affix my signature, in presence of two witnesses.

GUSTAF A. BROWN.

Witnesses:
 G. A. ALLEN,
 HENRY RANSOM.

---

Copies of this patent may be obtained for five cents each, by addressing the "Commissioner of Patents, Washington, D. C."